United States Patent [19]

Gardill

[11] Patent Number: 5,614,285
[45] Date of Patent: Mar. 25, 1997

[54] MOLDED PANEL HAVING A DECORATIVE FACING AND MADE FROM A BLEND OF NATURAL AND PLASTIC FIBERS

[75] Inventor: Rainer F. Gardill, Reichersbeuern, Germany

[73] Assignee: Ceats, Grosse Pointe Farms, Mich.

[21] Appl. No.: 348,331

[22] Filed: Dec. 2, 1994

[51] Int. Cl.⁶ ................................................. B32B 3/00
[52] U.S. Cl. ........................ 428/156; 428/131; 428/137; 428/158; 428/187; 428/304.4; 442/35
[58] Field of Search .................................... 428/218, 233, 428/236, 247, 248, 249, 282, 286, 298, 302, 131, 137, 156, 158, 187, 304.4, 284, 296

[56] References Cited

U.S. PATENT DOCUMENTS

| | | |
|---|---|---|
| 3,415,714 | 12/1968 | Hider . |
| 3,419,455 | 12/1968 | Roberts . |
| 3,620,906 | 11/1971 | Hannes . |
| 3,629,052 | 12/1971 | Knoepfler et al. . |
| 3,687,873 | 8/1972 | Kropscott et al. . |
| 3,928,693 | 12/1975 | Rudloff . |
| 3,961,001 | 6/1976 | Bethe . |
| 3,968,294 | 7/1976 | Robitschek et al. . |
| 3,973,066 | 8/1976 | Smith, II et al. ........................ 428/91 |
| 4,018,646 | 4/1977 | Ruffo et al. ........................ 428/298 |
| 4,201,835 | 5/1980 | Jellinck . |
| 4,240,857 | 12/1980 | Vecchia et al. . |
| 4,242,398 | 12/1980 | Segawa et al. ........................ 428/172 |
| 4,247,586 | 1/1981 | Rochlin . |
| 4,269,884 | 5/1981 | Della Vecchia et al. . |
| 4,323,625 | 4/1982 | Coran et al. . |
| 4,478,660 | 10/1984 | Landler et al. . |
| 4,491,556 | 1/1985 | Fujii et al. . |
| 4,546,899 | 10/1985 | Williams . |
| 4,569,873 | 2/1986 | Robbins . |
| 4,579,764 | 4/1986 | Peoples, Jr. et al. . |
| 4,579,774 | 4/1986 | Kuwazuru et al. ........................ 428/290 |
| 4,879,170 | 11/1989 | Radwanski et al. ........................ 428/233 |
| 4,908,176 | 3/1990 | Kato . |
| 5,091,031 | 2/1992 | Strapazzini . |
| 5,120,593 | 6/1992 | Kurihara . |
| 5,308,896 | 5/1994 | Hansen et al. . |
| 5,328,759 | 7/1994 | McCormack et al. . |
| 5,352,480 | 10/1994 | Hansen et al. . |
| 5,354,606 | 10/1994 | Kjelby et al. . |
| 5,437,919 | 8/1995 | Welich et al. ........................ 428/245 |

FOREIGN PATENT DOCUMENTS

| | | |
|---|---|---|
| 3932121 | 4/1991 | Germany . |
| 2090849 | 7/1982 | United Kingdom . |

Primary Examiner—James J. Bell
Attorney, Agent, or Firm—Reising, Ethington, Barnard & Perry

[57] ABSTRACT

A laminated panel (60) made of a reinforced non-woven flexible mat (10) with a content of thermoplastic fibers which is provided on at least one side with a plastic-containing decorative layer (72) The mat (10) is connected with the decorative layer (72) by the use of pressure and heat via an intermediate scrim layer (74) having thermoplastic fibers. The process for forming a panel (60) includes preheating the mat (10) by passing a heated gaseous flow through the mat to evenly heat the mat throughout. A layer of unheated decorative vinyl (71) and the preattached scrim layer (74) are placed in a mold (30). The preheated mat (10) is then placed into the mold (30). The mold is promptly closed and pressed to bond the layers of mat, scrim, and decorative vinyl layer together to form the laminated panel.

13 Claims, 4 Drawing Sheets

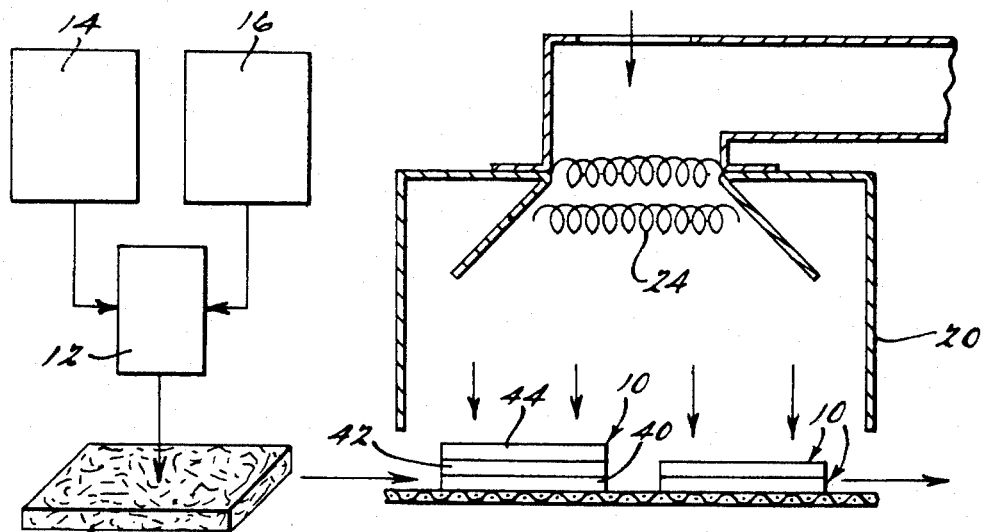
FIG. 1.
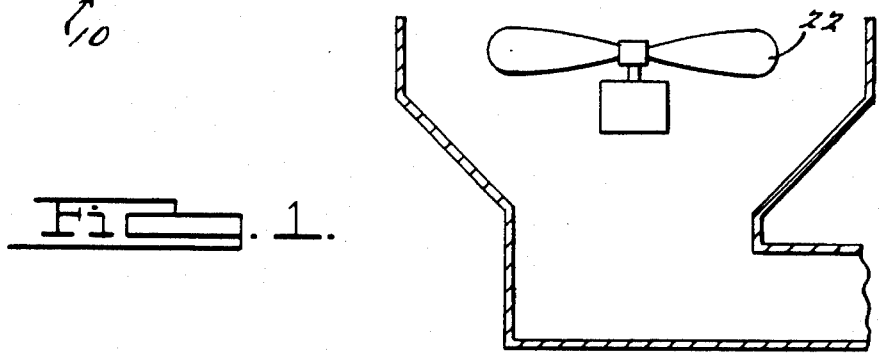
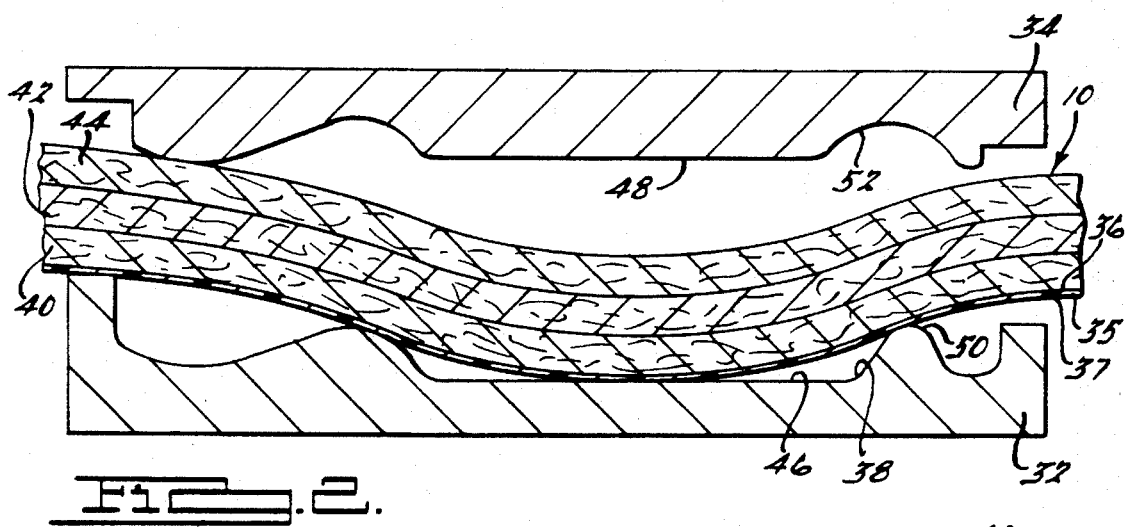
FIG. 2.
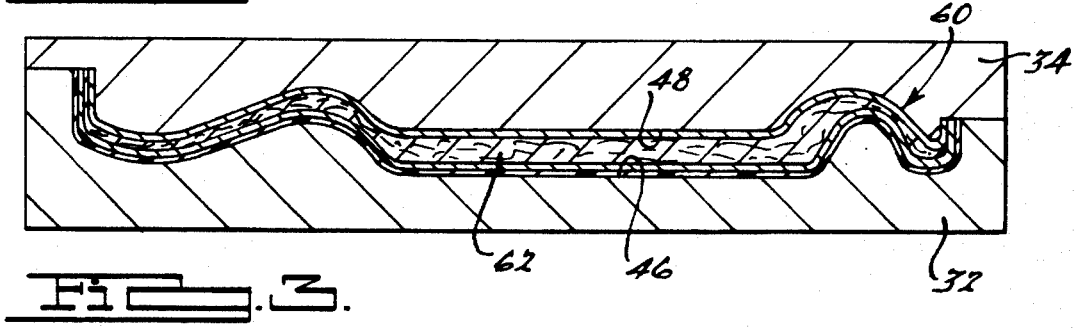
FIG. 3.

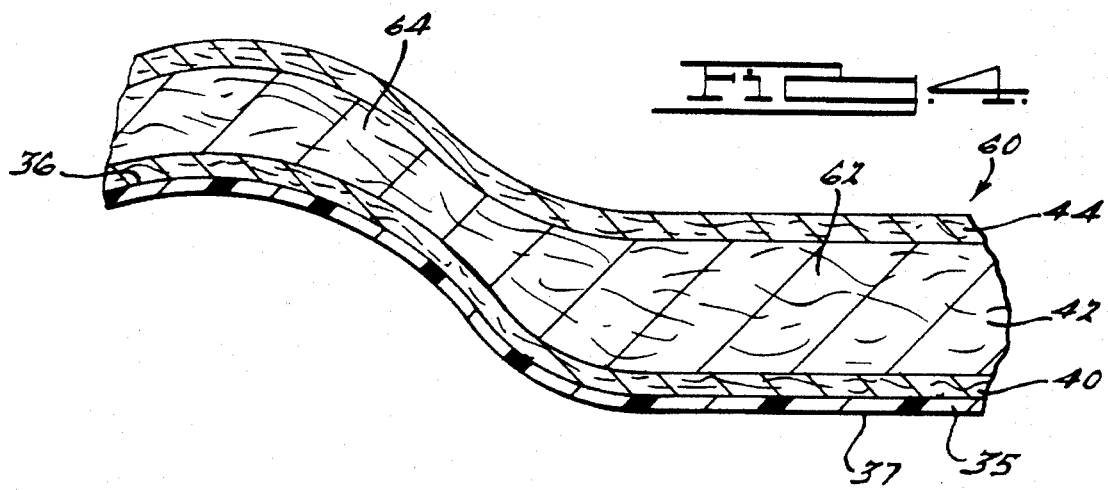
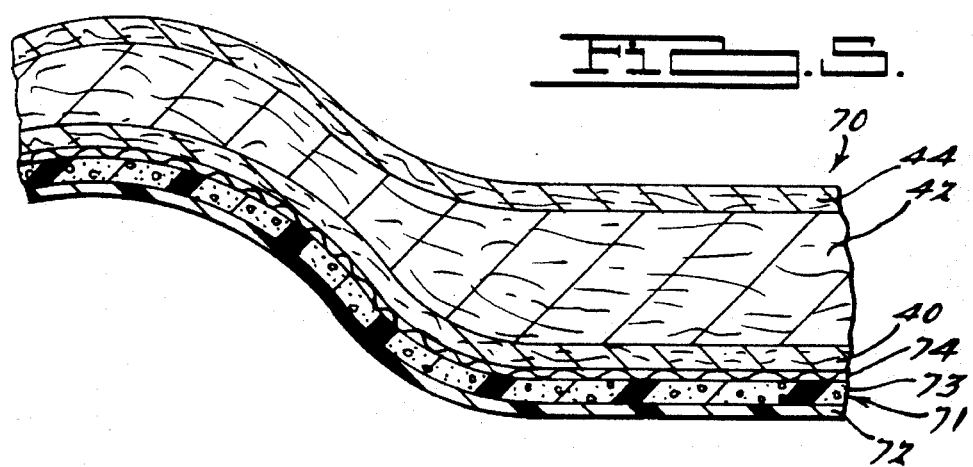
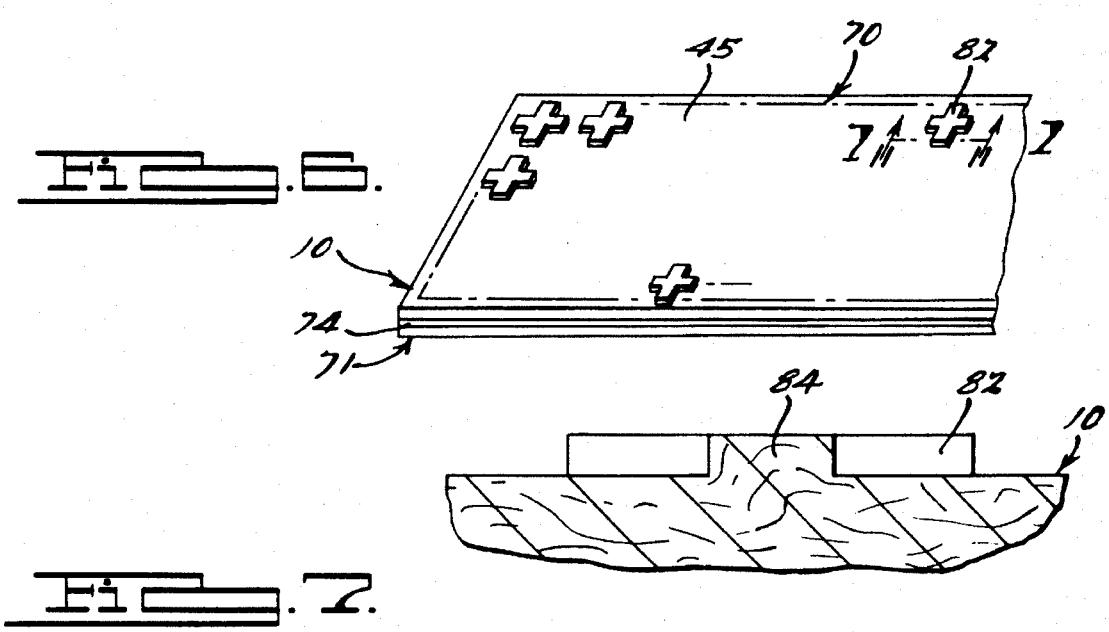

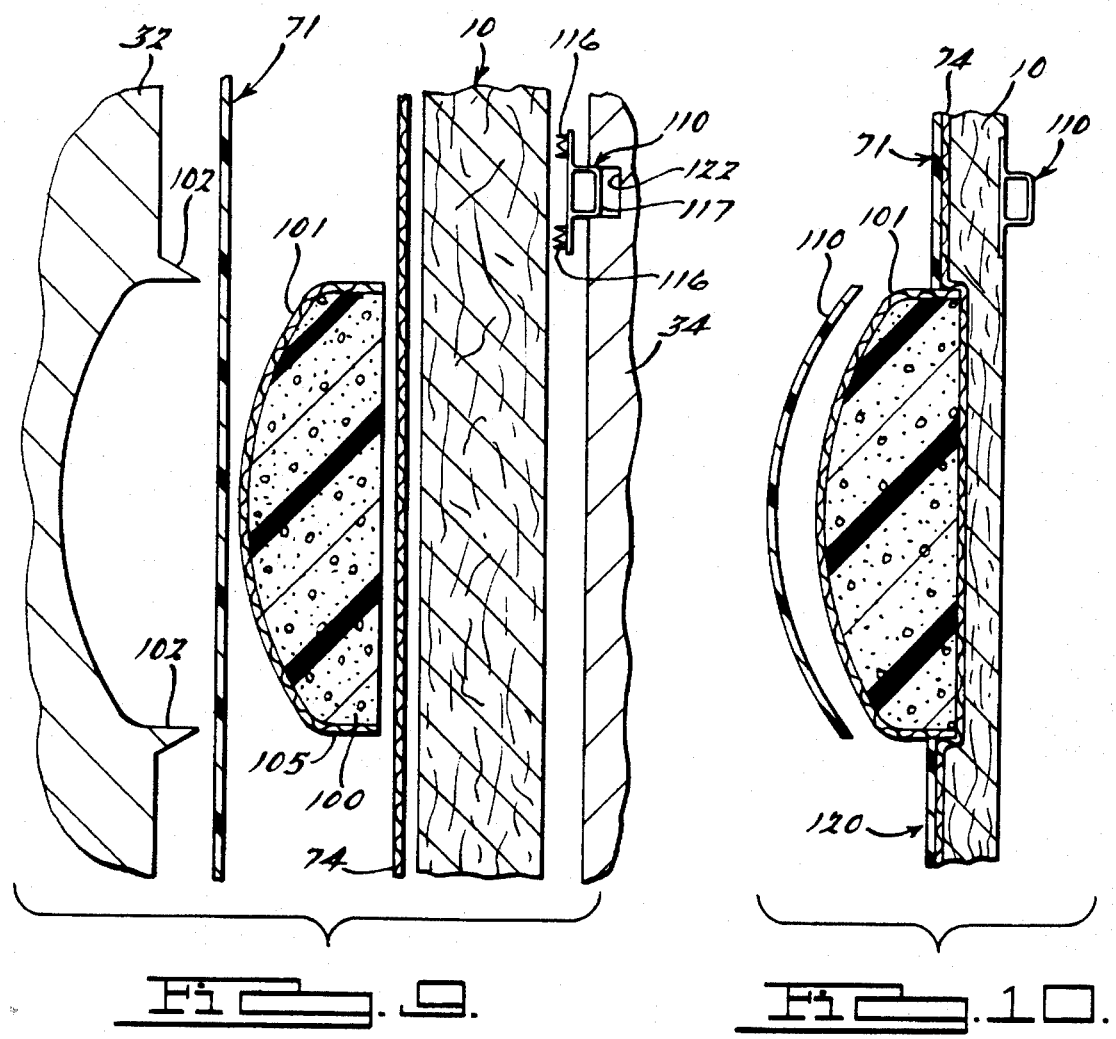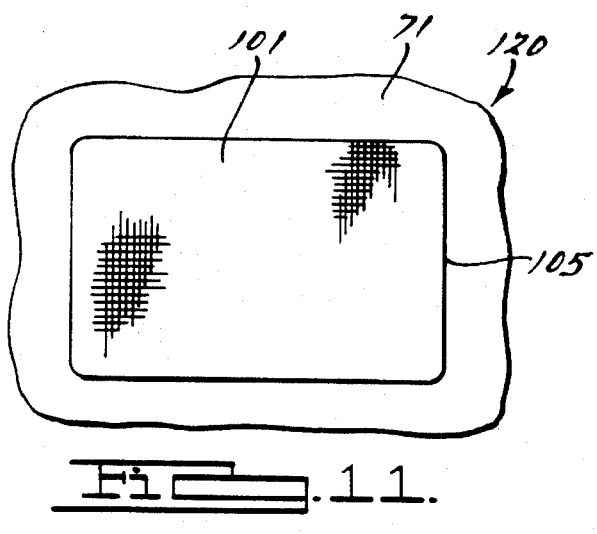

MOLDED PANEL HAVING A DECORATIVE FACING AND MADE FROM A BLEND OF NATURAL AND PLASTIC FIBERS

TECHNICAL FIELD

The field of this invention relates to a structured molded panel for use with automotive interiors and a process of making such a panel.

BACKGROUND OF THE DISCLOSURE

Automotive interiors have many interior panels that form the interior door panels, floor panels, and rear deck storage panels. The panels need to be structurally sound and light weight while being expeditiously made from readily accessible materials. Because of the high volume of automotive vehicles being manufactured each year, great efforts have been made to make the cars from environmentally friendly materials. These environmentally friendly materials are either recyclable, i.e. they can be reused a second time, or may be made from recycled materials, i.e. they are being used for a second time.

Another source of materials that is considered environmentally friendly is material that would otherwise be waste. The salvaging of material that is otherwise waste provides for a second chance for material that would otherwise be burned or deposited in landfills. Natural materials are considered because of their renewable natural fiber content. Flax is grown in great quantities for its seed which is crushed to obtain its desirable flaxseed oil. However, since the days when synthetic materials and other cloth greatly replaced the dominant use of linen, the flax chaff and stalks have found little use and often lie in the field as waste material. This situation is particularly acute in North America where the flax is primarily grown for the seed. Flax stalk is often burned since its oily content repels water thereby inhibiting its quick degradation back into the soil.

It has been known to incorporate flax or other natural cellulose fibers in a composite material. However, previous compositions that incorporated natural fillers either did not have the structural integrity within the dimensional thinness needed for molded contoured automotive panels or could not be expeditiously made to produce a consistent product having a cosmetic or decorative facing. The process used to blend and mold the fibers with the plastic resin required the plastic resin to be in a melted or liquid state and required mixing of the fibers with the liquid before the resin sets. Furthermore, the fibers need to be chopped because longer lengths of fibers tend to clog the nozzle of extruders or injection molding machines resulting in defective molding. However, the structural supporting properties of the fibers are lessened and the stiffness of the board may drop when shorter fibers are used.

Furthermore, the heat in previous molding processes often ruined the temperature sensitive cosmetic or decorative facing. Heat can destroy textured surfaces as well as any foam backings to the decorative layers. On the other hand, the absence of heat above room temperature prevents the proper joining of structural layers. Crazing also can appear in deformation areas if the materials are overly cool during deformation.

What is needed is an expeditious molding process that in a single molding step provides an automotive interior structurally supportive panel having a decorative facing and if desired can incorporate a sound insulating layer and anchored fastener members.

SUMMARY OF THE DISCLOSURE

In accordance with one aspect of the invention, a process for forming a panel for an automotive interior includes the step of forming a mat of blended material. The material is made from a blend of thermoplastic fibers and natural fibers, preferably approximately one-half polypropylene and one-half flax fibers by weight. The mat is made by a commercially available machine that manufactures the mat from polypropylene and flax fibers to a desired thickness. The mat is flexible, porous and preferably non-woven. The mat is placed into a heating chamber with heated gaseous flow passing through the mat to evenly heat the mat throughout its entire interior and exterior surfaces to at least the melting temperature of the thermoplastic fibers. In the case of polypropylene the mat is heated to approximately 200° C. The shape of the mat is retained by the natural fibers.

A layer of cosmetic covering is placed in an unheated mold between two mold halves with opposing surfaces. The cosmetic covering may be an unformed layer, a contoured preform, or sprayed directly on a mold surface of one die. If sound insulation is desired, a layer of sound insulating material is placed within or against the mat prior to the molding thereof. If the sound insulating material is porous, it may be stacked with the mat and heated therewith.

In one embodiment, the cosmetic covering is made from vinyl material with a pre-attached foam backing at its underside. If the underside of the covering material is a material that is not compatible and does not bond directly to the thermoplastic in the mat, an intermediate scrim material is preattached either directly to the vinyl or if present, the foam back. The scrim is positioned to be interposed between the covering layer and mat to bind at one side to the backside of the covering material and at a second side to the thermoplastic at the outer surface of the mat. If the back side of the covering is compatible, the cosmetic covering may directly bond to the mat without any scrim. The heated mat is then placed in the mold and the mold dies are promptly closed and pressed to exert pressure on the layers of mat, sound insulating material and the cosmetic covering.

When the mold is closed and pressure exerted, the flax fibers compress together with the melted thermoplastic within the mat. The thermoplastic material also makes contact with the cosmetic covering. The mold is retained closed until the compressed layers in the mold are cooled and the thermoplastic bonds the flax fibers together and the cosmetic covering becomes bonded to the mat. The mold dies are then opened and the completed molded panel is removed.

If the panel needs to be mounted to a support or vehicle door via fastener members, the fastener members may be anchored into the panel during the molding process without interfering with the integrity or appearance of the cosmetic covering.

In an embodiment which incorporates a layer of sound insulating material, it is preferable that the opposing surfaces of the respective mold dies when in the closed position have a varying distance therebetween. The varying distance provides a finished sound insulating panel with varying thickness. A substantial part of the varying thickness is due to the change in thickness of the sound insulating layer which also provides a change in density of the sound insulating layer. The sound insulating layer in one embodiment is a layer of non-woven cotton. In another embodiment, the sound insulating layer is a layer of Kaldex™ by DuPont or a similar commercial product.

According to another aspect of the invention, a laminated sound insulating panel for use in automotive interiors includes a cosmetic covering layer bonded to a multi-layer mat of a blend of thermoplastic fibers and natural fibers, preferably approximately one-half flax fibers and one-half polypropylene fibers by weight. A layer of non-woven sound insulating material is interposed between a first and second layer of the flax and polypropylene mat. The insulating material preferably is impregnated with a thermoplastic material that is compatible or similar to the thermoplastic used in the mat. In another embodiment the layer of sound insulation may be a layer of blended thermoplastic fibers and natural fibers with approximately 80% by weight being natural fibers.

A fabric covered component may be interposed between the decorative layer and the mat such that, after forming the panel, the overlying portion of the decorative layer is removed to reveal the fabric covered component as a decorative addition to the panel.

In this fashion, the panel with the above described features is made in a single compression molding step.

BRIEF DESCRIPTION OF THE DRAWINGS

Reference now is made to the accompanying drawings in which:

FIG. 1 is a schematic view illustrating one embodiment according to the invention;

FIG. 2 is side elevational segmented view of an open mold shown in FIG. 1;

FIG. 3 is view similar to FIG. 2 illustrating the mold dies moved to a closed position;

FIG. 4 is a fragmentary segmented view of the molded article removed from the mold shown in FIG. 3;

FIG. 5 is a view similar to FIG. 4 illustrating an alternate embodiment;

FIG. 6 is a top perspective view of an alternate embodiment of the layer of flax with sound deadening embossments;

FIG. 7 is a cross-sectional view taken along lines 7—7 shown in FIG. 6;

FIG. 8 is a side elevational segmented view of another embodiment in accordance with the invention;

FIG. 9 is a view similar to FIG. 2 illustrating another embodiment of the invention;

FIG. 10 is a side elevational segmented view of a molded article shown in FIG. 9 after removal from the mold;

FIG. 11 is a plan view of the molded article shown in FIG. 10;

DETAILED DESCRIPTION OF THE PREFERRED EMBODIMENT

Figure 12:
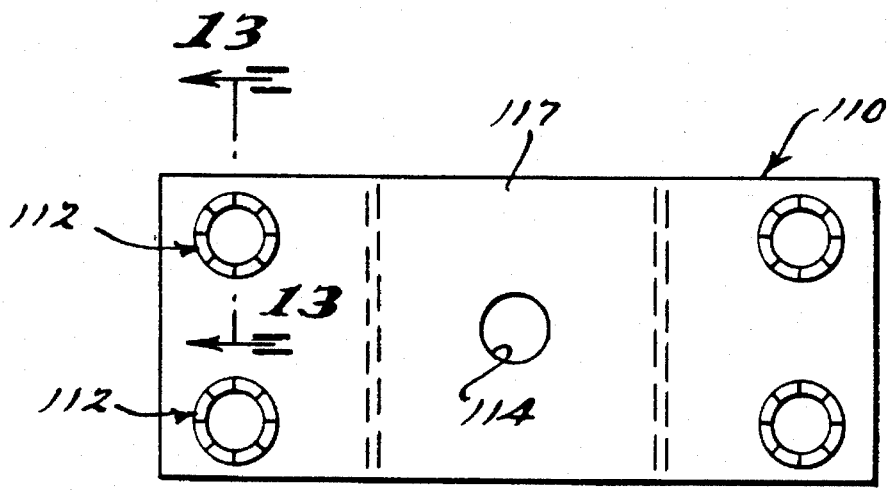
FIG. 12 is an enlarged plan view of the fastening member.

Referring now to FIG. 1, a flexible needled non-woven mat 10 is made on a commercially available needling machine 12. The needling machine 12 builds the mat 10 from a supply of polypropylene fibers 14 and a supply of flax fibers 16 at 50% polypropylene and 50% flax by weight. Variations from this preferred 50—50 ratio may be acceptable. The percentage of flax may be between 40–70% by weight depending on the particular applications. The needling machine 12 builds the mat 10 with multiple loosely inter-connected thin layers which is quite porous to air flow.

The needling machine 12 is operated at room temperature with the polypropylene being in the form of solid flexible fibers. A single layer of mat 10 has a thickness of approximately one and one-half inches and a mass of approximately 2000 grams/meter$^2$. The wide range between 100 grams/meter$^2$–3000 grams/meter$^2$ is foreseen depending on the particular application.

The mat 10 is then transferred into a furnace 20. If desired and as described below, several layers 40 and 42 of mat 10 may be stacked upon each other. Furthermore, a porous sound insulating material 42 may be placed between the layers of mat 10. The layer 42 may be a pre-pressed non-woven recycled cotton fiber. The furnace evenly heats the layers of mat 10 and any sound insulating layer 42 to a temperature of approximately 200° C. To obtain even heating throughout the mat interior, an air current is set up by a fan 22 which draws air from a heat source 24 (electric or gas) and passes the air through one or more layers of the mat 10. The heated air, by being drawn through the mat 10, evenly heats the mat 10 throughout its interior.

Immediately after the layers of mat 10 are heated to the proper 200° C. temperature, the layers of mat 10 and sound insulation 42 are transferred into an unheated mold assembly 30. The time needed within furnace 20 is dependent on mass of mat 10 and sound insulation 42. For many applications thirty to fifty seconds may be sufficient to adequately heat the layers to 200° C.

The mold assembly has a die 32 and die 34. One side of die 32 may be covered with an unheated cosmetic covering 35 for example a thermal plastic olefin (tpo). The mat 10 and material 42 are placed on the back side 36 of the tpo cosmetic covering to form layers 40, 42 and 44. The front side 37 of the cosmetic covering faces the contoured mold die surface 38.

The mold assembly is closed, as shown in FIG. 3, immediately after the layers 35, 40, 42 and 44 are correctly positioned therein. The heat from the mat 10 undergoing pressure from the mold assembly bonds the flax fibers together with the polypropylene. In this example, large opposing planar sections 46 and 48 of the mold dies 32 and 34 are spaced farther apart than the opposing contoured sections 50 and 52 of the mold dies 32 and 34. Mold die 32 may have its surface 38 embossed to form a design or texture in the surface 37 of the tpo layer 35.

The mold dies are at ambient temperature and not heated by any source other than what heat the mats 10 transfers to the mold dies. A cooling mechanism (not shown) dissipates excess heat from the mold. A minimal pressure of 5 bars provides sufficient compressive force to achieve part configuration within the mold.

The mold remains under pressure until the polypropylene resolidifies which can, depending on the application and thickness of the materials, range between 30 and 140 seconds. The mold is then opened and a finished panel 60 is formed, as shown in FIGS. 3 and 4, with large planar sections 62 having a thicker cross-section than contoured sections 64. The increased thickness is primarily due to the increased thickness of layer 42 at the planar sections 62 due to the mold shape.

An alternate embodiment is shown in FIG. 5. In this panel 70, the tpo cosmetic covering 35 in FIG. 4 is replaced by a lamination of heat sensitive foam backed vinyl material 71 with a vinyl decoration layer 72, a foam backing 73, and a heat barrier scrim 74. It is common to receive vinyl layer 72 with layers of foam 73 already affixed together in a single lamination 71. A heat barrier thin scrim material 74 is prebonded to the foam layer 73. The scrim material is a compatible thermoplastic material that can bond to the polypropylene plastic in layer 40 of mat 10 and the polyester material can be a suitable material for the scrim layer 74. The lamination 71 of scrim 74, foam 73, and vinyl 72 is unheated when placed in the mold. With a layer of scrim 73 having a mass of approximately 100 grams/meter$^2$, it has been discovered that the scrim layer 74 protects the soft foam layer 73 and decorative vinyl layer 72 from an unacceptably high heat transfer from the mat 10 that would otherwise damage the foam 73 and vinyl 72. However, the scrim does soften under the heat and securely bonds to the layer 40 of mat 10.

Other sound insulation may be accomplished by embossing the flax mat 10 as shown in FIGS. 6 and 7 with embossments 82. In this embodiment, a vinyl laminated layer 71 includes a vinyl layer 72 and a layer of scrim 74. The scrim 74 is bonded to the mat 10. The die surface 80 of upper mold 34 may be appropriately embossed to create embossments 82 in the back surface 45 of mat 10 to inhibit the transmission of sound waves laterally through the mat 10. The embossments 82 are actually raised and create thicker areas 84 in mat 10 as shown in FIG. 7.

Another embodiment which provides a sound insulating layer is illustrated in FIG. 8. In this embodiment as with other previously described embodiments, a scrim layer 74 is preattached to the vinyl lamination 71. On the back surface 45 of mat 10 lies another layer 90 of polypropylene fibers and flax fiber. This layer 90 has by weight approximately 80% flax fibers and approximately 20% polypropylene. The mat 10 and layer 90 are preheated to 200° and then placed in the mold. The scrim 74 becomes bonded to the front surface of mat 10. The layer 90 also becomes bonded to mat 10. When released, the 20% polypropylene is an insufficient amount to keep the flax totally compressed, and the flax fibers in layer 90 rebound after being released from the mold. The rebound lowers the density of layer 90 which acts as a dampener of sound. The layer 90 may be fabricated separately and laid with mat 10 before they enter furnace 20. Other sound insulation material such as Kaldex™ material by DuPont may be used for layer 90. However because Kaldex™ is nonporous, the mat 10 is preheated first and then stacked together with the Kaldex™ layer 90. The Kaldex™ layer 90 may also be separately preheated for greater flexibility during the molding process.

Furthermore, the cosmetic surface may further incorporate cushioned areas or inserts that are commonly known for door panels. The process does not inhibit the incorporation of these known cushioned inserts. As shown in FIG. 9, decorative fabric covered cushioned insert 100 is interposed between the tpo layer 35 and mat 10. The mold die 32 has an embossed spring loaded cutting edge 102 which conforms to the shape of the periphery 105 of the cushioned insert 100. The cutting edge 102 tucks the tpo layer 35 into the mat 10 and cuts the piece of tpo 110 that overlies the cushion 100. After the mold opens, the tpo piece 110 is removed to expose the cushion 100 and its decorative fabric 101 as shown in FIG. 11. The cushion insert 100 as shown in FIG. 10 is raised with respect to the rest of the panel 120. However, the panel 120 may be molded such that the fabric covering 101 is coplanar or even recessed with respect to the tpo section 35 of panel 120.

Figure 13:
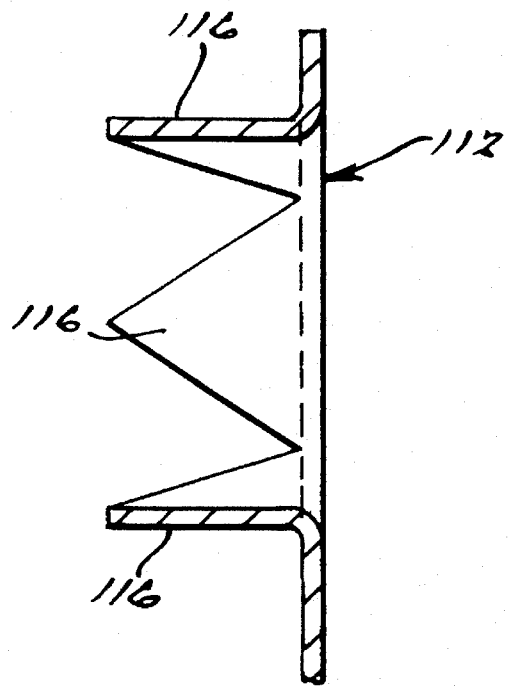
FIG. 13 is an enlarged cross-sectional view taken along lines 13—13 shown in FIG. 12.

As also shown in FIGS. 9 and 10, the process also provides for the securement of one or more fastener members 110 to the panel during the molding process without the need for a separate step or other applied adhesive. Each fastener member 110, as shown in more detail in FIGS. 12 and 13 has a plurality of rosettes 112 with distal pointed prongs 116. A raised section 112 includes a threaded aperture therethrough 114 which can be fastened to a bolt. These types of fastener members 110 are commercially available.

During the molding process, the raised section 117 is aligned with a recessed section 120 in mold part 34. The molds are closed with sufficient pressure to cause each prong 116 to deflect generally parallel with the plane of the panel while embedded in the mat 10. After the mat 10 cools, the now generally parallel prongs 116 are embedded and anchor the fastener member 110 to the panel 120. The prongs 116 are embedded only in matt 10 and do not interfere with the structure of cosmetic appearance of vinyl layer 71. The prongs 116 remain concealed under vinyl layer 71.

In this fashion, an expeditious process forms an automotive interior structurally self-supportive panel that incorporates material that may be recycled or otherwise waste material. The panel may be, for example, a back panel shelf or an interior door panel. The panel may incorporate sound insulation and other constructions that reduce an effect commonly referred to as the drum effect. The expeditious process creates a structurally supportive panel that may have an embossed or textured cosmetic surface as well as cushioned inserts.

Other variations and modifications are possible without departing from the scope and spirit of the present invention as defined by the appended claims.

The embodiments in which an exclusive property or privilege is claimed are defined as follows:

1. A laminated panel for use in automotive interiors characterized by:

a mat made from fibers with some of the fiber being a first thermoplastic material;

a plastic containing a decorative layer connected to one side of the mat by the application of pressure and heat via an intermediate scrim layer;

said scrim layer having fibers made of a second thermoplastic fiber which is a different material from that of the fibers of thermoplastic material in the mat and having a melting temperature at least as high as the thermoplastic material in the mat; and the mat being a blend of fibers made from said first thermoplastic material and natural fibers formed in a non-woven mat.

2. A laminated body in accordance with claim 1 further characterized by:

the first thermoplastic material in the mat is one of a polyester and polypropylene material.

3. A laminated body in accordance with claim 2 further characterized by:

the scrim layer being made from one of a polyester and polypropylene material.

4. A laminated panel in accordance with claim 1 further characterized in that the natural fibers in the mat are flax fibers.

5. A laminated panel as defined in claim 1 further characterized by:

said natural fibers comprise approximately 50% of said mat by weight;

said thermoplastic fibers comprise approximately 50% of the mat by weight;

said natural fiber being flax and said thermoplastic being one of polyester and polypropylene material.

6. A laminated panel in accordance with claim 1, characterized in that a foam layer is located between the decorative layer and the scrim layer.

7. A laminated panel as defined in claim 6 further characterized by:

a cushion insert with a decorative fabric covering and being bonded to said panel;

said decorative plastic layer and foam layer having an aperture conforming to the peripheral shape of the cushion insert to allow the decorative fabric covering at a top surface of said cushion insert to be visible.

8. A laminated panel as defined in claim 1 further characterized by:

a fastener member extending behind from said mat and being anchored in said mat behind said decorative layer.

9. A laminated panel as defined in claim 1 further characterized by:

a cushion insert with a decorative fabric covering and being bonded to said panel;

said decorative plastic layer having an aperture conforming to the peripheral shape of the cushion insert to allow the decorative fabric covering at a top surface of said cushion insert to be visible.

10. A laminated panel as defined in claim 1 further characterized by:

said mat being adhered to a layer of non-woven sound insulating material.

11. A laminated panel as defined in claim 10 further characterized by:

said sound insulating material being a porous non-woven material interposed between two layers of said mat.

12. A laminated panel as defined in claim 10 further characterized by:

said sound insulating material being adhered against a bottom surface of said mat and comprising approximately 80% natural fiber and approximately 20% thermoplastic material by weight.

13. A laminated panel as defined in claim 1 further characterized by:

said mat having a bottom surface with a plurality of embossments having less density than the rest of the mat and being spaced apart to absorb sound and reduce resonant vibrations of said mat.

* * * * *